US012666360B2

(12) United States Patent
Lai et al.

(10) Patent No.: US 12,666,360 B2
(45) Date of Patent: Jun. 23, 2026

(54) ADAPTIVE POWER SAVING AND LATENCY CONTROL MECHANISM

(71) Applicant: MEDIATEK INC., Hsin-Chu (TW)

(72) Inventors: Cheng-Kung Lai, Hsinchu City (TW);
Chia-Ning Chang, Hsinchu City (TW);
Po-Hao Hsiao, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 330 days.

(21) Appl. No.: 18/373,984

(22) Filed: Sep. 28, 2023

(65) Prior Publication Data

US 2024/0114458 A1 Apr. 4, 2024

Related U.S. Application Data

(60) Provisional application No. 63/378,087, filed on Oct. 3, 2022.

(51) Int. Cl.
*H04W 52/02* (2009.01)
(52) U.S. Cl.
CPC ............................... *H04W 52/0241* (2013.01)
(58) Field of Classification Search
CPC ......... H04W 52/0241; H04W 52/0216; H04W 52/0248; H04W 52/0254
See application file for complete search history.

(56) References Cited

U.S. PATENT DOCUMENTS

| | | | |
|---|---|---|---|
| 2007/0077960 A1* | 4/2007 | Jain ....................... | H04W 88/06 |
| | | | 455/550.1 |
| 2014/0286217 A1 | 9/2014 | Park | |
| 2015/0282081 A1* | 10/2015 | Oren ..................... | H04W 76/12 |
| | | | 455/574 |
| 2016/0014773 A1 | 1/2016 | Seok | |
| 2019/0037489 A1 | 1/2019 | Wang | |
| 2019/0364503 A1* | 11/2019 | Kasslin ............. | H04W 52/0229 |

FOREIGN PATENT DOCUMENTS

EP 4 044 693 A1 8/2022

* cited by examiner

*Primary Examiner* — Jamal Javaid
(74) *Attorney, Agent, or Firm* — Winston Hsu

(57) ABSTRACT

The present invention provides a wireless communication method, wherein the wireless communication method includes the steps of: controlling the electronic device to operate in an active mode and communicating with an access point; after a traffic between the electronic device and the access point ends, controlling the electronic device to operate in a first mode, and transmitting a null frame to notify the access point that the electronic device enters a power saving mode; and during the first mode, controlling the electronic device to leave the power saving mode and transmitting at least one query signal to the access point to ask data.

20 Claims, 7 Drawing Sheets

ADAPTIVE POWER SAVING AND LATENCY CONTROL MECHANISM

CROSS REFERENCE TO RELATED APPLICATIONS

This application claims the benefit of U.S. Provisional Application No. 63/378,087, filed on Oct. 3, 2022. The content of the application is incorporated herein by reference.

BACKGROUND

Power-saving is an important key success factor of a portable electronic device with batteries, and various chip designers and manufacturers are trying to reduce power consumption to prolong the use time of electronic devices. For a station wirelessly communicating with an access point as an example, if the station determines that there is currently no traffic, the station will send a null frame with a power management bit to inform the AP that the station will enter a power saving mode or a sleep mode; and after receiving the null frame with the power management bit, the access point will buffer the data that needs to be sent to the station, and the AP notifies the station by using a next beacon with traffic indication map (TIM). The station should periodically listen to the beacon during the listen interval, and once the station receives the beacon with TIM, the station leaves the power saving mode and enters an active mode to receive the data from the AP. In one case, after the station leaves the power saving mode to receive the data, if the station enters the power saving mode immediately after the data reception, upcoming data will be buffered in the AP. That is, the data will not be received by the station until the next beacon with TIM is received, causing high data latency.

In order to reduce the data latency, the station may be designed to stay in the active mode for a long time such as 200 milliseconds after the traffic ends. If data is coming during this period, the station can immediately receive the data without delay. However, if no data is coming during this period, the station will have unnecessary power consumption.

SUMMARY

It is therefore an objective of the present invention to provide a power saving and latency control mechanism of the station, which can send a query signal to the AP to know if the AP has buffered data for the station, and the station can immediately enter the active mode to receive the data from the AP without waiting for the next beacon frame, to solve the above-mentioned problems.

According to one embodiment of the present invention, a wireless communication method of an electronic device comprises the steps of: controlling the electronic device to operate in an active mode and communicating with an access point; after a traffic between the electronic device and the access point ends, controlling the electronic device to operate in a first mode, and transmitting a null frame to notify the access point that the electronic device enters a power saving mode; and during the first mode, controlling the electronic device to leave the power saving mode and transmitting at least one query signal to the access point to ask data.

According to one embodiment of the present invention, an electronic device is configured to perform the steps of: controlling the electronic device to operate in an active mode and communicating with an access point; after a traffic between the electronic device and the access point ends, controlling the electronic device to operate in a first mode, and transmitting a null frame to notify the access point that the electronic device enters a power saving mode; and during the first mode, controlling the electronic device to leave the power saving mode and transmitting at least one query signal to the access point to ask data.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
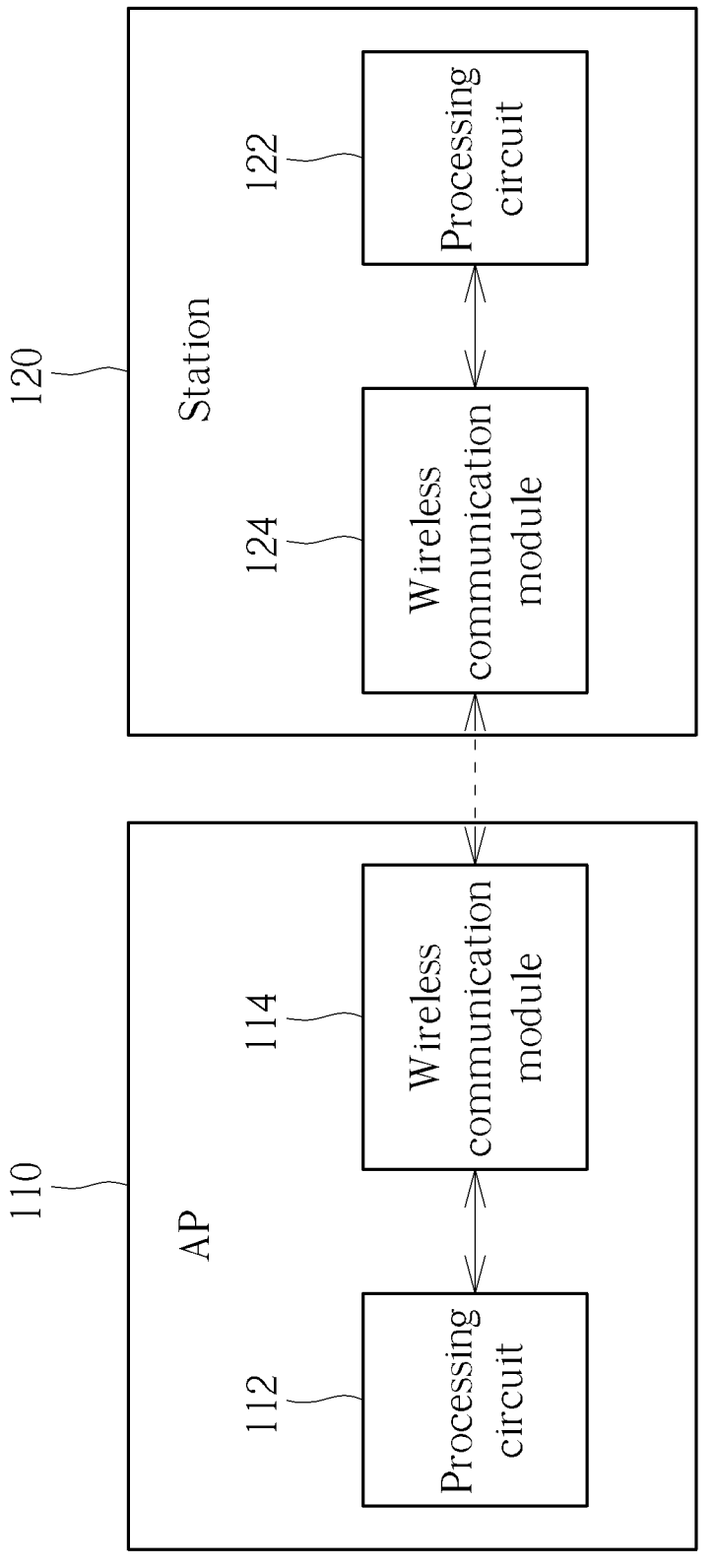
FIG. 1 is a diagram illustrating a wireless communication system according to one embodiment of the present invention.

FIG. 1 is a diagram illustrating a wireless communication system according to one embodiment of the present invention. As shown in FIG. 1, the wireless communication system comprises an access point (AP) 110 and at least one station such as 120. The AP 110 is a Wi-Fi access point that allows other wireless devices such as the station 120 to connect to a wired network, and the AP 110 mainly comprises a processing circuit 112 and a wireless communication module 114. The station 120 is a Wi-Fi station comprising a processing circuit 122 and a wireless communication module 124, and the station 120 can be a cell phone, a tablet, a notebook, or any other electronic device capable of wirelessly communicating with the AP 110.

In the operation of the AP 110 and the station 120, the station 120 can operate in a power saving mode (i.e., sleep mode) or an active mode, wherein the power saving mode is for reducing power consumption (i.e., the station 120 disables part of the analog circuits within the wireless communication module 124, so that the station 120 cannot receive data packet from the AP 110), and the active mode is for communicating with the AP 110. In addition, when the station 120 operates in the power saving mode, the AP 110 still periodically generates beacons to the station 120, and the station 120 will periodically receive the beacons during the listen interval to determine if switching to the active mode. For example, if the AP 110 buffers data that is to be sent to the station 120, the AP 110 will send a beacon with a traffic indication map (TIM) including an association identity (AID) of the station 120, to notify the station 120 to receive the data. After receiving this beacon, the station 120 leaves the power saving mode and enters the active mode to receive packets from the AP 110.

As described in the background of the present invention, if the station enters the power saving mode immediately after the data reception, upcoming data will be buffered in the AP, causing high data latency. In addition, if the station is designed to stay in the active mode for a long time after the traffic ends, the station will have unnecessary power consumption if no data is coming during this period. To solve this problem, the station 120 has an adaptive power saving mechanism, which can actively enter and leave the power saving mode, to improve the data latency and power consumption of the station 120.

Figure 2:
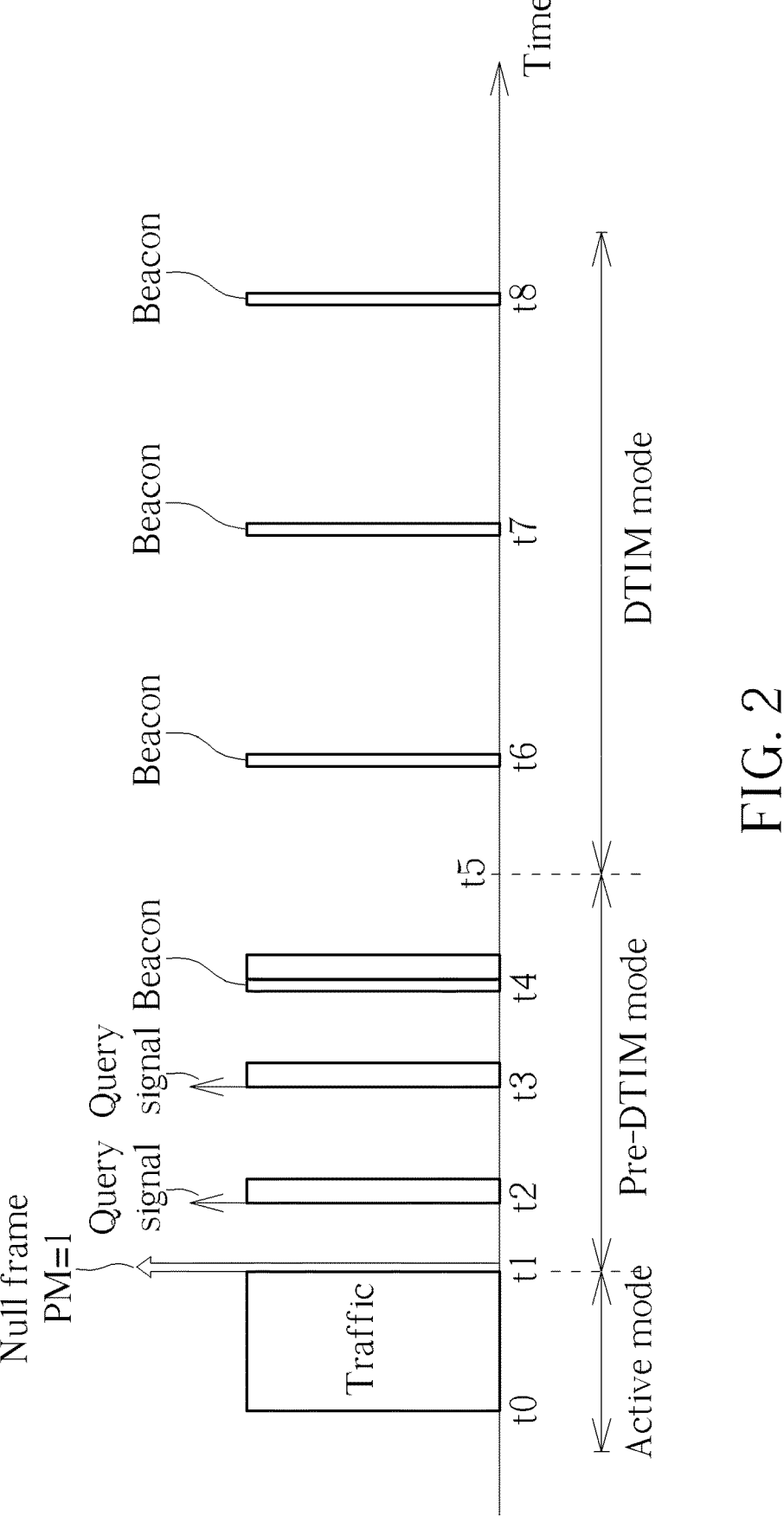
FIG. 2 is a timing diagram of the station according to a first embodiment of the present invention.

FIG. 2 is a timing diagram of the station 120 according to a first embodiment of the present invention. As shown in FIG. 2, initially the station 120 operates in the active mode, and the station 120 receives data packets from the AP 110 and/or sends data packets to the AP 110. At time t1, the traffic between the station 120 and the AP 110 ends, and the station 120 immediately sends a null frame to inform the AP 110 that the station 120 will enter the power saving mode. In this embodiment, the null frame is a control frame that is only transmitted by the station 120, and the purpose of the null frame is to carry a power management (PM) bit, wherein the power management bit may correspond to "0" or "1", the power management bit "0" indicates that the station 120 will enter the active mode, and the power management bit "1" indicates that the station 120 will enter the power saving mode. In this embodiment, the station 120 sends the null frame with the power management bit "1", so the AP 110 knows that the station 120 enters the power saving mode and the transmission of frames from AP 110 to station 120 is not allowed, and the AP 110 buffers the data that is to be sent to the station 120, if any, within an internal buffer of the AP 110.

In this embodiment, after the station 120 sends the null frame with the power management bit "1", the station 120 enters a pre-DTIM (Delivery Traffic Indication Map) mode, and the station 120 actively enter or leave the power saving mode within the pre-DTIM mode. In one embodiment, not a limitation of the present invention, the pre-DTIM mode may have a fixed length of time, and the duration of the pre-DTIM mode is longer than a beacon interval of the AP 110. Specifically, as shown in FIG. 2, the duration of the pre-DTIM mode between t1-t5 may be 200 ms, which is longer than the beacon interval such as 100 ms.

In the pre-DTIM mode, the station 120 sends one or more query signals to the AP 110 to ask the data, wherein the interval between two query signals is less than the beacon interval. For example, at time t2, the station 120 leaves the power saving mode and enters an active mode actively for a short time. In one embodiment, actively leaving the power saving mode and entering the active mode means that this operation is triggered by the signals which can be controlled to have different intervals rather than triggered by receiving beacon periodically transmitted by the AP 110; or actively leaving the power saving mode and entering the active mode is not for the purpose of receiving any beacon from the AP 110. At this time, in response to the query signal, if the AP 110 has buffered data for the station 120, the AP 110 can respond the query signal and start to transmit the buffered data to the station 120, and the station 120 can extend the duration of the active mode and receive the data packets from the AP 110; and if the AP 110 does not buffer any data for the station 120, the AP 110 sends a response to notify the station 120 that no data is buffered, and the station 120 can immediately enter the power-saving mode. Similarly, at time t3, the station 120 actively leaves the power saving mode and enters an active mode, for receiving data packets, if any, from the AP 110.

Because the station 120 sends one or more query signals to the AP 110 within the pre-DTIM mode, and the interval between two query signals is less than the beacon interval, the time for the data buffered in the AP will be shortened to reduce data latency, especially if the AP 110 has data to be sent to the station 120 immediately after time t1.

In one embodiment, without a limitation of the present invention, the query signal is a PS-poll defined in IEEE 802.11 specifications.

In the pre-DTIM mode, the station 120 receives the beacon from the AP 110 at time t4, and if the station 120 receives the beacon with TIM including the AID of the station 120, the station 120 leaves the power saving mode and enters the active mode to receive the data from the AP; and if the station 120 receives the beacon without TIM including the AID of the station 120, the station 120 immediately enters the power saving mode again.

In the pre-DTIM mode shown in FIG. 2, it is assumed that the AP 110 does not buffer any data for the station 120, that is the AP 110 sends a response to notify the station 120 that no data is buffered for the query signal at time t2 and time t3, and the beacon at time t4 does not comprise TIM including the AID of the station 120. Therefore, since there is no data sent from the AP 110 to the station 120, at time t5, the station 120 enters the DTIM mode. It is noted that, if the AP 110 need to send data packet in response to the query signal at time t2, t3 or the beacon at time t4, the station 120 will send the null frame with the power management bit "0" to notify the AP 110 that the station 120 enters the active mode, and the flow can be regarded as starting from t0.

Because the station 120 does not receive data packet in the pre-DTIM mode, the probability of buffered data at the AP 110 in a short period of time is not high, so in the DTIM mode the station 120 does not transmit the query signal to the AP 110 to ask data to lower the power consumption, and the station 120 periodically receive the beacon from the AP 110 during the listen interval, such as at time t6, t7 and t8, to determine if switching to the active mode to receive data packet.

In the embodiment shown in FIG. 2, by entering the power-saving mode at time t1 when the traffic between the AP 110 and the station 120 ends, and actively leaving the power-saving mode to transmit one or more query signals to ask data in the pre-DTIM mode, the station 120 can have a good configuration between data latency and power saving.

Figure 3:
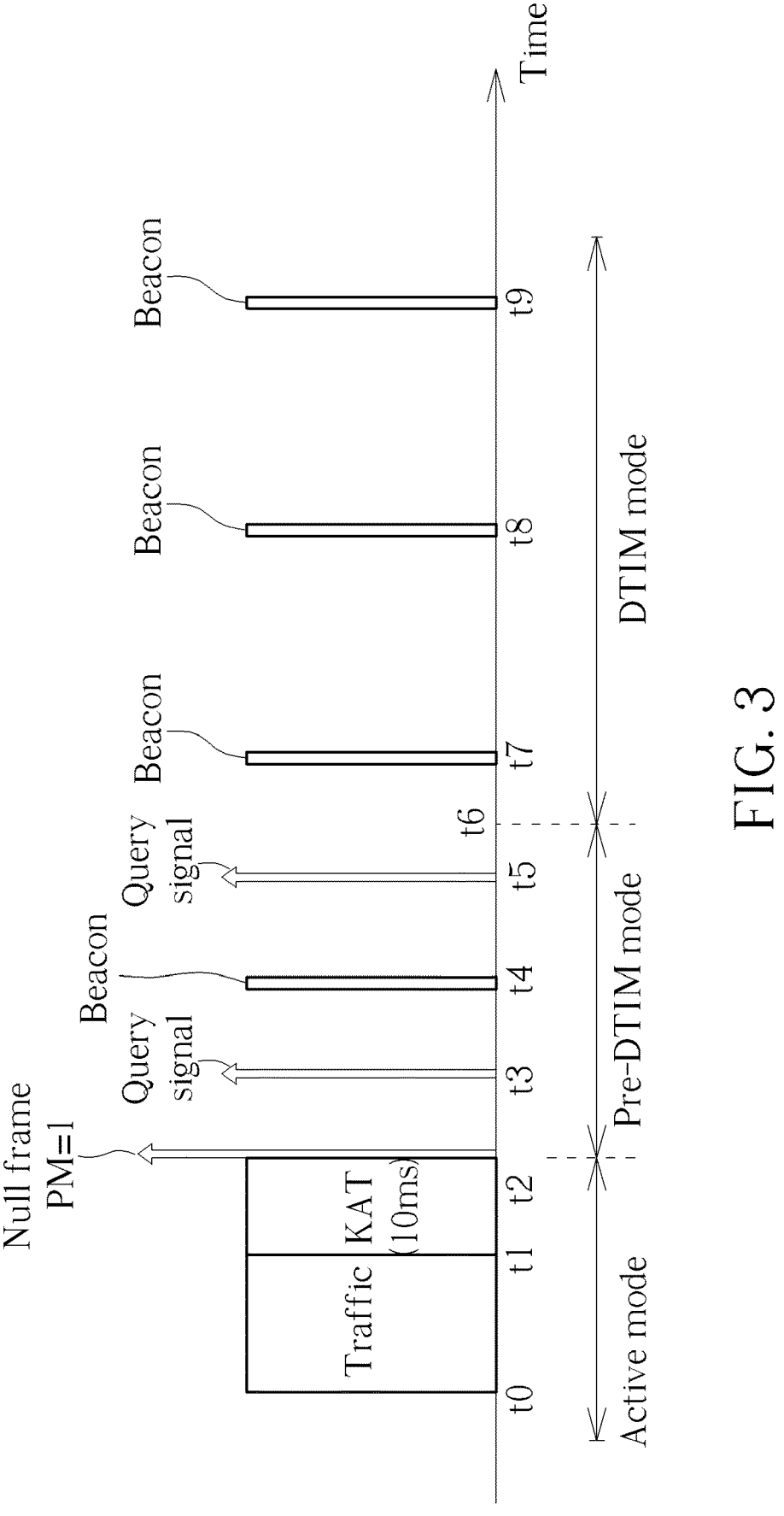
FIG. 3 is a timing diagram of the station according to a second embodiment of the present invention.

FIG. 3 is a timing diagram of the station 120 according to a second embodiment of the present invention. As shown in FIG. 3, initially the station 120 operates in the active mode, and the station 120 receives data packets from the AP 110 and/or sends data packets to the AP 110. At time t2, the traffic between the station 120 and the AP 110 ends, and because sometimes the AP 110 may transmit data packets densely, the station still operate in the active mode for a period of time (hereinafter, keep alive time, KAT) such as 10 ms to listen the message from the AP 110, even if there is no data transmission within the keep alive time. At time t2, the station 120 sends a null frame with the power management bit "1", so the AP 110 knows that the station 120 enters the power saving mode and the transmission of frames from AP 110 to station 120 is not allowed, and the AP 110 buffers the data that is to be sent to the station 120, if any, within an internal buffer of the AP 110.

In this embodiment, after the station 120 sends the null frame with the power management bit "1", the station 120 enters a pre-DTIM mode, and the station 120 actively enter and leave the power saving mode within the pre-DTIM mode. In one embodiment, not a limitation of the present invention, a summation of the keep alive time and duration of the pre-DTIM mode may have a fixed length of time, and the duration of the keep alive time and the pre-DTIM mode is longer than a beacon interval of the AP 110. Specifically, as shown in FIG. 2, the duration between t1-t6 may be 200 ms, which is longer than the beacon interval such as 100 ms.

In the pre-DTIM mode, the station 120 sends one or more query signals to the AP 110 to ask data, wherein the interval between two query signals is less than the beacon interval. Specifically, at time t3, the station 120 actively leaves the power saving mode and enters an active mode (i.e., without receiving any beacon from the AP 110) for a short time. At this time, in response to the query signal, if the AP 110 has buffered data for the station 120, the AP 110 can respond the query signal and start to transmit the buffered data to the station 120, and the station 120 can extend the duration of the active mode and receive the data packets from the AP 110; and if the AP 110 does not buffer any data for the station 120, the AP 110 sends a response to notify the station 120 that no data is buffered, and the station 120 can immediately enter the power-saving mode. Similarly, at time t5, the station 120 actively leaves the power saving mode and enters an active mode, for receiving data packets, if any, from the AP 110.

In the pre-DTIM mode, the station 120 receives the beacon from the AP 110 at time t4, and if the station 120 receives the beacon with TIM including the AID of the station 120, the station 120 leaves the power saving mode and enters the active mode to receive the data from the AP; and if the station 120 receives the beacon without TIM including the AID of the station 120, the station 120 immediately enters the power saving mode again.

In the pre-DTIM mode shown in FIG. 2, it is assumed that the AP 110 does not buffer any data for the station 120. Therefore, since there is no data sent from the AP 110 to the station 120, at time t6, the station 120 enters the DTIM mode. It is noted that, if the AP 110 need to send data packet in response to the query signal at time t3, t5 or the beacon at time t4, the station 120 will send the null frame with the power management bit "0" to notify the AP 110 that the station 120 enters the active mode, and the flow can be regarded as starting from t0.

In the DTIM mode, the station 120 does not transmit the query signal to the AP 110 to ask data to lower the power consumption, and the station 120 periodically receive the beacon from the AP 110 during the listen interval, such as at time t7, t8 and t9, to determine if switching to the active mode to receive data packet.

In the embodiment shown in FIG. 3, by configuring the keep alive time when the traffic between the AP 110 and the station 120 ends, entering the power-saving mode at time t2, and actively leaving the power-saving mode to transmit one or more query signals to ask data in the pre-DTIM mode, the station 120 can have a good configuration between data latency and power saving.

In one embodiment, the station 120 may have two or more configurations of keep alive time and pre-DTIM mode, and the station 120 can select one of the configurations based on the information of the previous pre-DTIM mode, wherein each configuration has different keep alive time or different interval between two adjacent query signals. Specifically, FIG. 4-FIG. 7 show configurations of keep alive time and pre-DTIM mode. Referring to a first configuration shown in FIG. 4, a summation of the keep alive time and duration of pre-DTIM mode may be 200 ms, the keep alive time may be a short time such as 10 ms, and the station 120 may send the query signals to the AP 110 with a larger interval so that only three query signals are sent to the AP 110 during the pre-DTIM mode. Referring to a second configuration shown in FIG. 5, a summation of the keep alive time and duration of pre-DTIM mode may be 200 ms, the keep alive time may be a short time such as 10 ms, and the station 120 may send the query signals to the AP 110 with a shorter interval so that four or more query signals are sent to the AP 110 during the pre-DTIM mode. Referring to a third configuration shown in FIG. 6, a summation of the keep alive time and duration of pre-DTIM mode may be 200 ms, the keep alive time may be a longer time such as 60 ms, and the station 120 may send three query signals with a shorter interval to the AP 110 during the pre-DTIM mode. Referring to a fourth configuration shown in FIG. 7, a summation of the keep alive time and duration of pre-DTIM mode may be 200 ms, the keep alive time may be a longer time such as 120 ms, and the station 120 may send two query signals with a shorter interval to the AP 110 during the pre-DTIM mode.

It is noted that quantity of the configurations that the station 120 can select and the count of the query signals in each configuration are for illustrative, not a limitation of the present invention. In other embodiments, the station 120 may have more configurations, and the configurations may have different keep alive time or query signal settings, or the configurations may only have different query signal settings such as different number of query signals and/or different intervals between two query signals.

Figure 4:
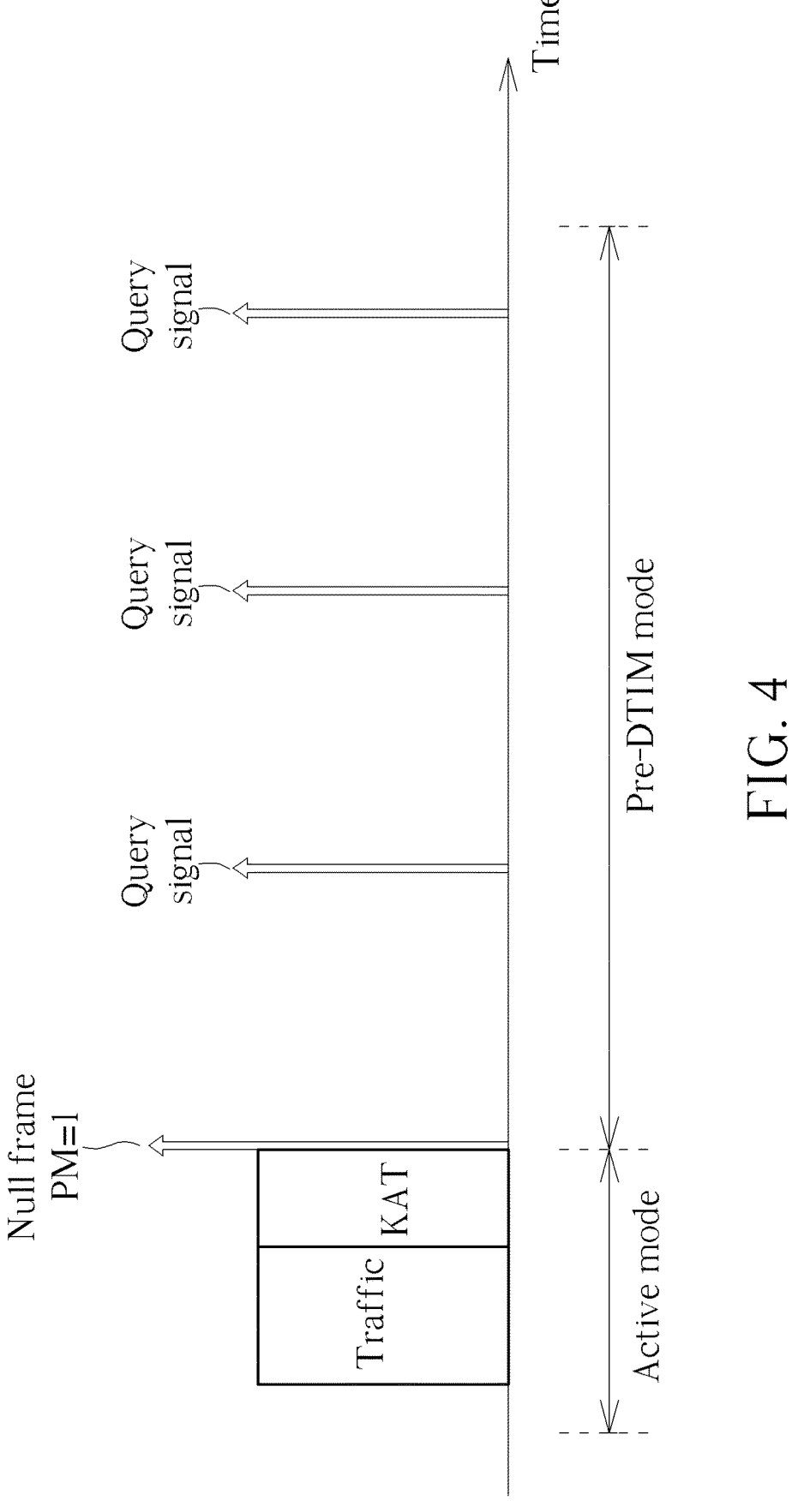
FIG. 4 shows a first configuration of keep alive time and pre-DTIM mode according to one embodiment of the present invention.
Figure 5:
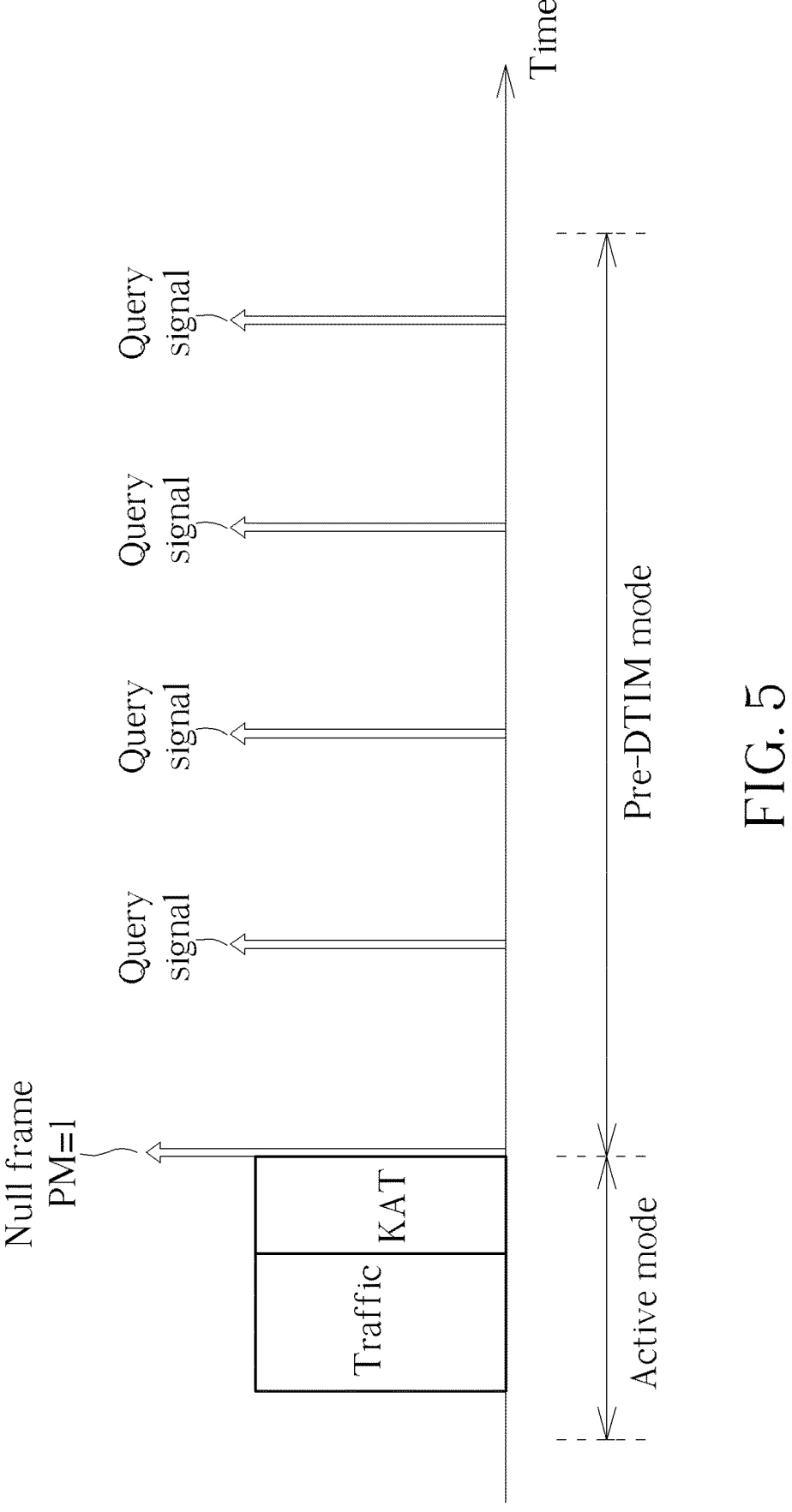
FIG. 5 shows a second configuration of keep alive time and pre-DTIM mode according to one embodiment of the present invention.
Figure 6:
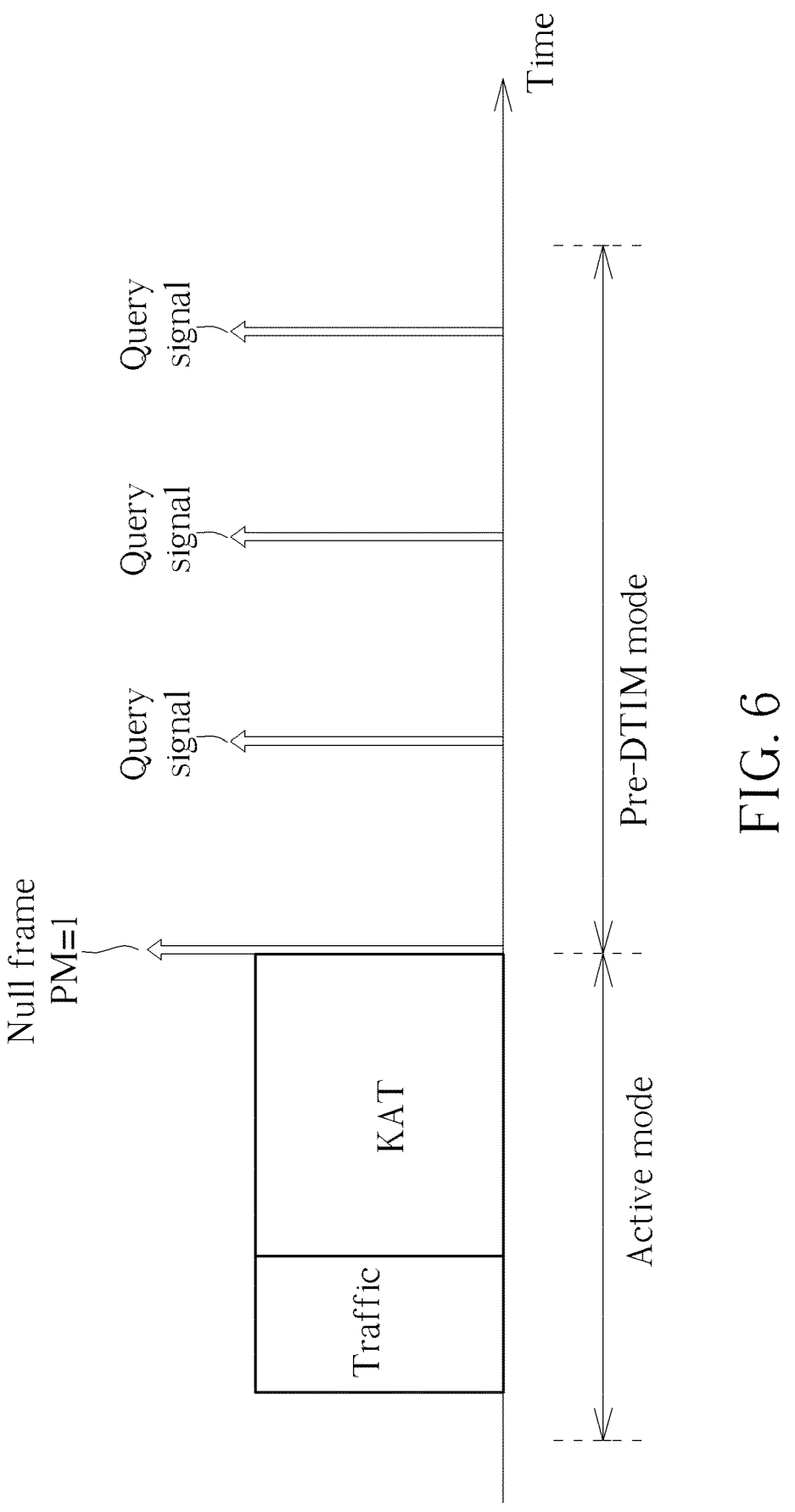
FIG. 6 shows a third configuration of keep alive time and pre-DTIM mode according to one embodiment of the present invention.
Figure 7:
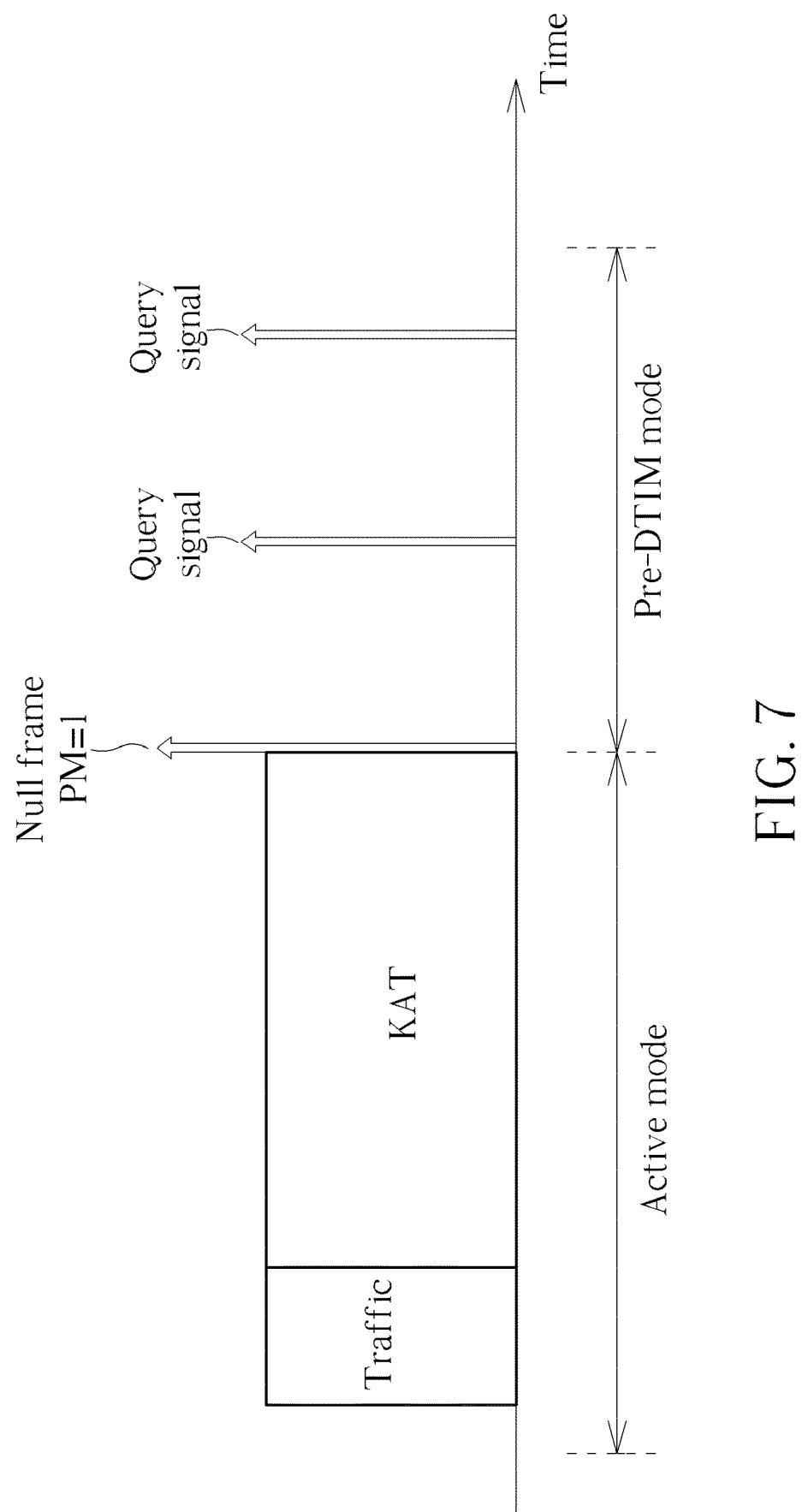
FIG. 7 shows a fourth configuration of keep alive time and pre-DTIM mode according to one embodiment of the present invention.

In this embodiment, the configurations of FIG. 4-FIG. 7 correspond to different power consumption and data latency, wherein the configuration of FIG. 4 has lowest power consumption (if no data packet is sent in the pre-DTIM mode) and highest data latency, and the configuration of FIG. 7 has highest power consumption (if no data packet is sent in the pre-DTIM mode) and shortest data latency. The station 120 can select one of the configurations based on the information of the previous pre-DTIM mode, wherein the information may indicate if the station 120 receives data packet in the previous pre-DTIM mode, or how many query signals that are really sent to the AP 110 in the previous pre-DTIM mode. Specifically, if the station 120 selects the configuration shown in FIG. 4 in the previous pre-DTIM mode, and the station 120 does not receive any data packet in the previous pre-DTIM mode, or the station 120 sends all the three query signals to the AP 110 in the previous pre-DTIM mode, the station 120 can still select the configuration shown in FIG. 4 in the current pre-DTIM mode. In addition, if the station 120 selects the configuration shown in FIG. 4 in the previous pre-DTIM mode, and the station 120 receives data packet in the previous pre-DTIM mode, or the station 120 sends only one or two query signals to the AP 110 in the previous pre-DTIM mode (i.e., the AP 110 sends the data packet in response to the first or second query signal, so the station 120 leaves the pre-DTIM mode), the station 120 can select the configuration shown in FIG. 5 for the current pre-DTIM mode.

Similarly, if the station 120 selects the configuration shown in FIG. 5 in the current pre-DTIM mode, and the station 120 does not receive any data packet in the current pre-DTIM mode, or the station 120 sends all the four query signals to the AP 110 in the current pre-DTIM mode, the station 120 can select the configuration shown in FIG. 4 in the next pre-DTIM mode. In addition, if the station 120 selects the configuration shown in FIG. 5 in the current pre-DTIM mode, and the station 120 receives data packet in the current pre-DTIM mode, or the station 120 sends only one or two query signals to the AP 110 in the current pre-DTIM mode, the station 120 can select the configuration shown in FIG. 6 for the next pre-DTIM mode.

Similarly, if the station 120 selects the configuration shown in FIG. 6 in the current pre-DTIM mode, and the station 120 does not receive any data packet in the current pre-DTIM mode, or the station 120 sends all the three query signals to the AP 110 in the current pre-DTIM mode, the station 120 can select the configuration shown in FIG. 5 in the next pre-DTIM mode. In addition, if the station 120 selects the configuration shown in FIG. 6 in the current pre-DTIM mode, and the station 120 receives data packet in the current pre-DTIM mode, or the station 120 sends only one or two query signals to the AP 110 in the current pre-DTIM mode, the station 120 can select the configuration shown in FIG. 7 for the next pre-DTIM mode.

In light of above, by selecting the configuration based on the information of the pre-DTIM mode, the station 120 can always have suitable keep alive time and pre-DTIM configuration, for optimizing the data latency and power saving.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication method of an electronic device, comprising:

controlling the electronic device to operate in an active mode and communicating with an access point;

after a traffic between the electronic device and the access point ends, controlling the electronic device to operate in a first mode, and transmitting a null frame to notify the access point that the electronic device enters a power saving mode; and during the first mode, controlling the electronic device to leave the power saving mode and transmitting at least one query signal to the access point to ask data;

wherein the step of during the first mode, controlling the electronic device to leave the power saving mode and transmitting the at least one query signal to the access point to ask data comprises:

selecting one of a plurality of configurations, wherein the plurality of configurations correspond to different number of query signals and/or different intervals between two adjacent query signals; and using the selected configuration to control the electronic device to transmit the at least one query signal to the access point to ask data.

2. The wireless communication method of claim 1, wherein duration of the first mode is longer than a beacon interval of the access point.

3. The wireless communication method of claim 2, further comprising:

if receiving a response of the at least one query signal or a beacon from the access point indicating that the access point has buffered data for the electronic device during the first mode, controlling the electronic device to leave the first mode and receiving data from the access point;

if not receiving a response of the at least one query signal or a beacon from the access point indicating that the access point has buffered data for the electronic device, controlling the electronic device to enter a second mode; and during the second mode, not transmitting any query signal to the access point to ask data, and periodically receiving the beacon from the access point.

4. The wireless communication method of claim 1, wherein the step of during the first mode, controlling the electronic device to leave the power saving mode and transmitting the at least one query signal to the access point to ask data comprises:

during the first mode, controlling the electronic device to leave the power saving mode and transmitting a plurality of query signals to the access point to ask data, wherein an interval between two adjacent query signals is less than a beacon interval of the access point.

5. The wireless communication method of claim 1, wherein the step of after the traffic between the electronic device and the access point ends, controlling the electronic device to operate in the first mode, and transmitting a null frame to notify the access point that the electronic device enters the power saving mode comprises:

after the traffic between the electronic device and the access point ends, immediately controlling the electronic device to operate in the first mode, and transmitting a null frame to notify the access point that the electronic device enters the power saving mode.

6. The wireless communication method of claim 1, wherein the step of after the traffic between the electronic device and the access point ends, controlling the electronic device to operate in the first mode, and transmitting a null frame to notify the access point that the electronic device enters the power saving mode comprises:

after the traffic between the electronic device and the access point ends, still operating in the active mode for a keep alive time to listen messages from the access point, even if there is no data transmission within the keep alive time; and when the keep alive time expires, controlling the electronic device to operate in the first mode, and transmitting a null frame to notify the access point that the electronic device enters the power saving mode.

7. The wireless communication method of claim 1, wherein the step of selecting one of the plurality of configurations comprises:

selecting one of the plurality of configurations according to information of a previous first mode.

8. The wireless communication method of claim 7, wherein the information of the previous first mode indicates if the electronic device receives data from the access point in the previous first mode, or how many query signals that are really sent to the access point in the previous first mode.

9. The wireless communication method of claim 8, wherein the electronic device uses a first configuration of the plurality of configurations to control the electronic device to transmit query signal(s) to the access point to ask data; and the step of selecting one of the plurality of configurations according to information of the previous first mode comprises:

if the information of the previous first mode indicates that the electronic device does not receive the data from the access point in the previous first mode, or the query signals that are really sent to the access point in the previous first mode reaches the number of query signals of the first configuration, selecting a second configuration of the plurality of configuration; and if the information of the previous first mode indicates that the electronic device receives the data from the access point in the previous first mode, or the query signals that are really sent to the access point in the previous first mode does not reach the number of query signals of the first configuration, selecting a third configuration of the plurality of configuration.

10. The wireless communication method of claim 8, wherein the interval between two adjacent query signals of the second configuration is longer than the interval between two adjacent query signals of the third configuration.

11. An electronic device comprising a processing circuit and a wireless communication circuit, wherein the wireless communication circuit is configured to perform the steps of:

controlling the electronic device to operate in an active mode and communicating with an access point;

after a traffic between the electronic device and the access point ends, controlling the electronic device to operate in a first mode, and transmitting a null frame to notify the access point that the electronic device enters a power saving mode; and during the first mode, controlling the electronic device to leave the power saving mode and transmitting at least one query signal to the access point to ask data;

wherein the step of during the first mode, controlling the electronic device to leave the power saving mode and transmitting the at least one query signal to the access point to ask data comprises:

selecting one of a plurality of configurations, wherein the plurality of configurations correspond to different number of query signals and/or different intervals between two adjacent query signals; and using the selected configuration to control the electronic device to transmit the at least one query signal to the access point to ask data.

12. The electronic device of claim 11, wherein duration of the first mode is longer than a beacon interval of the access point.

13. The electronic device of claim 12, further comprising:

if receiving a response of the at least one query signal or a beacon from the access point indicating that the access point has buffered data for the electronic device during the first mode, controlling the electronic device to leave the first mode and receiving data from the access point;

if not receiving a response of the at least one query signal or a beacon from the access point indicating that the access point has buffered data for the electronic device, controlling the electronic device to enter a second mode; and during the second mode, not transmitting any query signal to the access point to ask data, and periodically receiving the beacon from the access point.

14. The electronic device of claim 11, wherein the step of during the first mode, controlling the electronic device to leave the power saving mode and transmitting the at least one query signal to the access point to ask data comprises:

during the first mode, controlling the electronic device to leave the power saving mode and transmitting a plurality of query signals to the access point to ask data, wherein an interval between two adjacent query signals is less than a beacon interval of the access point.

15. The wireless communication device of claim 11, wherein the step of selecting one of the plurality of configurations comprises:

selecting one of the plurality of configurations according to information of a previous first mode.

16. An electronic device comprising a processing circuit and a wireless communication circuit, wherein the wireless communication circuit is configured to perform the steps of:

controlling the electronic device to operate in an active mode and communicating with an access point;

after a traffic between the electronic device and the access point ends, controlling the electronic device to operate in a first mode, and transmitting a null frame to notify the access point that the electronic device enters a power saving mode; and during the first mode, controlling the electronic device to leave the power saving mode and transmitting at least one query signal to the access point to ask data;

wherein the step of during the first mode, controlling the electronic device to leave the power saving mode and transmitting the at least one query signal to the access point to ask data comprises:

during the first mode, controlling the electronic device to leave the power saving mode and transmitting a plurality of query signals to the access point to ask data, wherein an interval between two adjacent query signals is less than a beacon interval of the access point.

17. The electronic device of claim 16, wherein duration of the first mode is longer than a beacon interval of the access point.

18. The electronic device of claim 17, further comprising:

if receiving a response of the at least one query signal or a beacon from the access point indicating that the access point has buffered data for the electronic device during the first mode, controlling the electronic device to leave the first mode and receiving data from the access point;

if not receiving a response of the at least one query signal or a beacon from the access point indicating that the access point has buffered data for the electronic device, controlling the electronic device to enter a second mode; and during the second mode, not transmitting any query signal to the access point to ask data, and periodically receiving the beacon from the access point.

19. The wireless communication device of claim 16, wherein the step of after the traffic between the electronic device and the access point ends, controlling the electronic device to operate in the first mode, and transmitting a null frame to notify the access point that the electronic device enters the power saving mode comprises:

after the traffic between the electronic device and the access point ends, immediately controlling the electronic device to operate in the first mode, and transmitting a null frame to notify the access point that the electronic device enters the power saving mode.

20. The wireless communication device of claim 16, wherein the step of after the traffic between the electronic device and the access point ends, controlling the electronic device to operate in the first mode, and transmitting a null frame to notify the access point that the electronic device enters the power saving mode comprises:

after the traffic between the electronic device and the access point ends, still operating in the active mode for a keep alive time to listen messages from the access point, even if there is no data transmission within the keep alive time; and when the keep alive time expires, controlling the electronic device to operate in the first mode, and transmitting a null frame to notify the access point that the electronic device enters the power saving mode.

\* \* \* \* \*